2,240,314

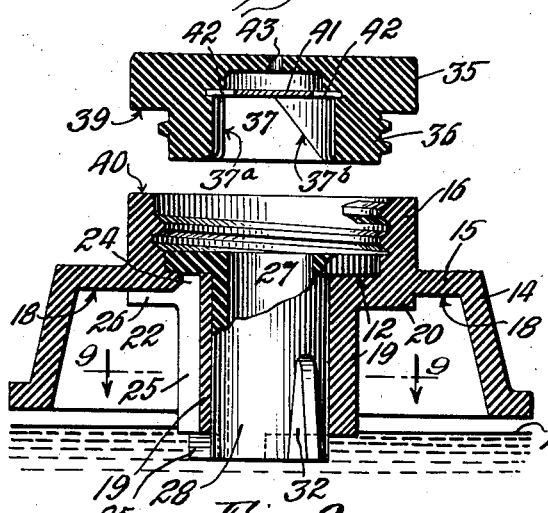
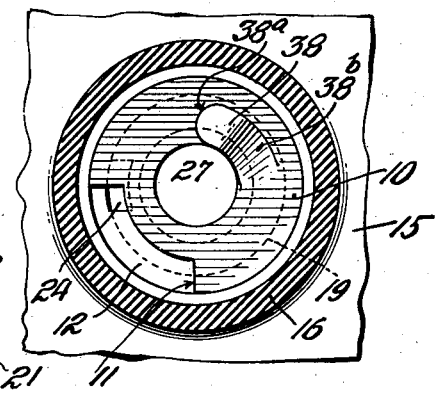
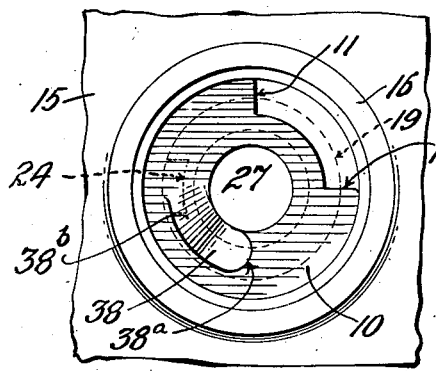
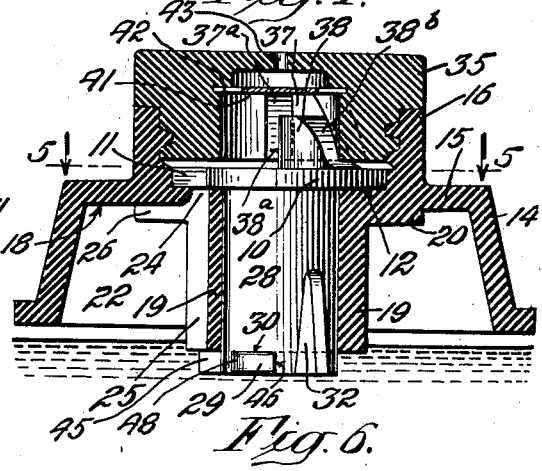
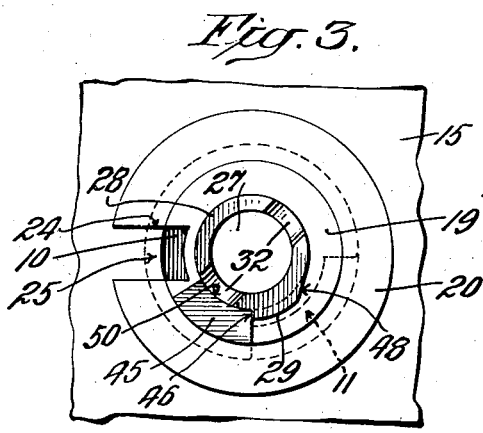
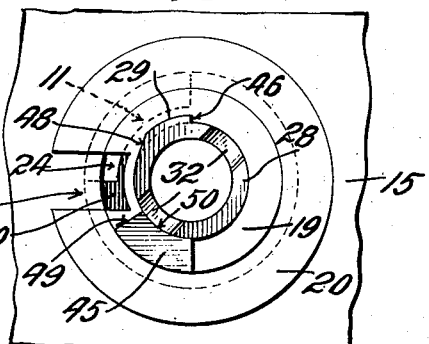
INVENTORS
ROLAND REPPERT
RUDOLPH A. JOHNSON
BY
English and Studwell
ATTORNEYS April 29, 1941.    R. REPPERT ET AL    2,240,314
CLOSURE FOR BATTERY BOX COVERS
Filed April 9, 1940    2 Sheets-Sheet 2
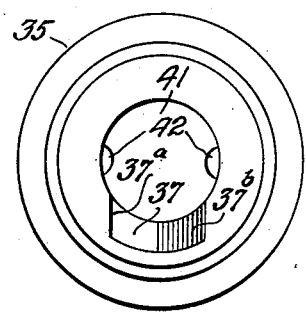
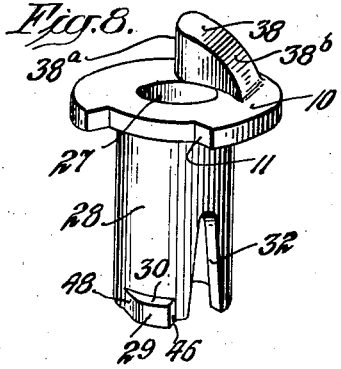
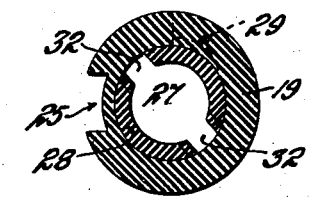
INVENTORS
ROLAND REPPERT
RUDOLPH A. JOHNSON
BY
English and Studwell
ATTORNEYS Patented Apr. 29, 1941

UNITED STATES PATENT OFFICE 2,240,314

CLOSURE FOR BATTERY BOX COVERS

Roland Reppert, Pelham Manor, and Rudolph A. Johnson, Brooklyn, N. Y., assignors to American Hard Rubber Company, New York, N. Y., a corporation of New York Application April 9, 1940, Serial No. 328,608

6 Claims. (Cl. 136—178)

The invention relates to an improvement in covers for battery boxes and other containers adapted to hold liquid at a predetermined level, the covers being provided with closure devices for permitting the introduction of liquid into the containers up to only the predetermined level and for thereafter permitting the escape to the atmosphere of gases generated in the liquid. More particularly, the invention is an improvement in battery box or other container-cover closure devices of the type provided with a vent cap and in which the act of removing the cap from the cover closes a vent passage so that the liquid introduced into the container rises to only the predetermined level and the placing of the cap on the cover opens the vent passage so that gas given off from the liquid may escape to the atmosphere.

One object of the invention is to provide an improved closure device in which the vent passage which communicates directly with or leads from the interior of the container is located in a valve seat with which cooperates a rotatable valve which is rotated by the vent cap—in one direction to close or cover the vent and in the opposite direction to uncover the vent—whereby the positive closing of the vent is assured when the cap is removed from the cover, and the positive uncovering of the vent is assured when the cap is applied to the cover to close the filling opening therein.

Another object of the invention is to provide a closure device of such construction that there is a choice of two filling openings, a relatively small opening and a relatively large one, the use of either of which for the time being excludes the use of the other. The smaller filling opening is located in the valve and is suitable for the occasional introduction of liquid into the container during the normal operation of the battery or other apparatus located in the container. The larger filling opening is located in a sleeve or the like in which the valve is adapted to be removably mounted, and, (when not occupied by the valve) is for use at the manufactory during charging of the battery plates, emptying out the spent electrolyte and then refilling the container with fresh electrolyte. When the valve occupies the sleeve the larger opening cannot be used for filling purposes, but only the relatively small opening in the valve. Thus the present invention provides a large opening which facilitates the filling and emptying of the container during plate-charging operations, and a relatively small opening for the occasional filling or replenishing of the container as required during its normal operation, the advantages of this arrangement being pointed out further on in the detail description of the valve and sleeve. Although removable from the sleeve, the valve cannot be displaced accidentally and can only be removed when turned to a certain position which the valve does not normally occupy during the usual liquid replenishing operations.

Other objects of the invention will appear as the description proceeds. To the accomplishment of these objects the invention consists in the improved container cover with the novel closure device hereinafter fully described and particularly pointed out in the appended claims.

In the accompanying drawings illustrating embodiments of the invention, Fig. 1 is a vertical transverse section (partly in side elevation) through the improved battery box cover with its novel closure device and showing the vent cap separated therefrom, the valve being in position closing the vent passage in the valve seat; Fig. 2 is a top plan view of the closure device with the vent cap removed and showing more clearly the valve in position closing the vent passage in the valve seat; Fig. 3 is a bottom plan view of the closure device and showing it in the position occupied in Figs. 1 and 2; Fig. 4 is a view similar to Fig. 1, but showing the vent cap connected with the cover and the valve in position uncovering the vent passage; Fig. 5 is a transverse section taken on the line 5—5 of Fig. 4; Fig. 6 is a bottom plan view showing the parts in the position occupied in Fig. 4; Fig. 7 is a bottom plan view of the vent cap; Fig. 8 is a perspective view of the valve; and Fig. 9 is a transverse section taken on the line 9—9 of Fig. 1.

The closure device of the present invention comprises a rotatable, annular valve which cooperates with an annular valve seat in which is located a vent passage which communicates directly with the interior of the container. The cooperating or working valve surfaces may be of any preferred cross-sectional contour, such as flat, conical or curved. For convenience of manufacture, the valve 10, as illustrated in the drawings, is a flat, flange or washer-like member which is seated upon a flat, annular valve seat 12 formed on the upper side of the top wall 15 of the improved battery box cover 14 which may in general outline be of usual formation. In the valve 10 is formed an aperture 11 which extends through the thickness of the valve, and is shown as an arcuate notch in the periphery of the valve. Rising from the upper surface of the top wall 15 of the cover 14 and concentrically surrounding the annular valve seat 12 is an internally threaded neck 16. Extending downwardly from the under surface 18 of the top wall 15 of the cover 14 is a valve sleeve 19 which is concentric with annular valve seat 12. The annular valve seat 12 in function constitutes the upper end of the valve sleeve 19. At the junction of the valve sleeve 19 and the surface 18 is a shoulder 20. The lower extremity of the sleeve 19 limits the height to which the electrolyte can rise in the battery box, in other words, the lower extremity of the valve sleeve is in a plane substantially coincident with the predetermined level 21 of the electrolyte. The space 22 between the under or inner surfaces of the cover 14 and the electrolyte and surrounding the sleeve 19 is termed a gas-receiving space because gases formed during the operation of the battery pass upwardly from the electrolyte into this space.

During the introduction of liquid into the battery box up to the predetermined level 21 of the electrolyte the space 22 is closed to the atmosphere and during the operation of the battery the space 22 is vented to the atmosphere. For this venting purpose the valve seat 12 is provided with a vent passage 24 which passes through the top wall 15 and leads into the space 22. This vent passage is adapted to be closed or open according to the position of the notch 11 of the valve 10. For convenience in molding, at the same time that the passage 24 is formed, there is formed the longitudinal groove 25 in the outer surface of the sleeve 19 and the groove 26 in the shoulder 20. It will be noted that the bottom of the groove 26 is flush with the under surface 18 of the top wall of the cover 14. This arrangement serves the double function of permitting venting from space 22 as far as surface 18, and permitting all the liquid in the container to be emptied out when necessary by uncovering vent 24 and turning the container up-side down.

The annular or washer-like valve 10 is provided on its under side with a downwardly extending tube 28 rotatably mounted in the valve sleeve 19, the opening through the tube being coaxial with the central opening 27 of the valve. To prevent accidental upward displacement of the valve and also flotation from its operative position in the valve sleeve during filling operations, the lower extremity of the tube 28 extends below the lower extremity of the sleeve 19 and is provided with an outwardly projecting lug or key 29 the upper edge 30 of which is adapted to engage with the lower end of the sleeve. In order to force the tube 28 downwardly into the sleeve 19 in spite of the key 29, the lower ends of the walls of the tube are provided with inverted V-shaped slots 32 which extend upwardly about one-half the length of the tube so as to permit the lower end of the tube wall carrying the key 29 to give inwardly far enough for the insertion of the key into the sleeve. When the tube has been pushed down into the sleeve 19 until the under or working surface of the valve 10 is in contact with the valve seat 12, the upper edge 30 of the key 29 is about even with the lower end of the sleeve. Thereupon, owing to the resiliency of the material of which the tube is composed (usually hard rubber, soft rubber or the like) the lower end of the tube wall carrying the key 29 will spring outwardly, bringing the key under the lower end of the valve sleeve 19 and thereby locking the valve in rotatable, operative position therein.

The valve 10 is turned in one direction to cover the vent passage 24 and in the opposite direction to uncover it, that is, to bring valve aperture 11 into registry with vent passage 24, by means of the vent cap 35, the lower tubular end 36 of which is reduced in size and is provided with an external thread adapted to screw into the internal thread in the neck 16 of the cover. The inner wall of the tubular part 36 of the vent cap is provided with an arcuate recess or slot 37 which, when the threaded part of the cap is placed in proper position in the mouth of the threaded opening in the cover, slips downwardly over and into driving engagement with the upper end of a stem or boss 38 rising from the upper surface of the valve 10.

It will be noted that the end 37a of the recess 37 is vertical whereas the other end 37b of the recess tapers or slopes downwardly and outwardly, and that the rounded end 38a of the boss 38, which corresponds to the vertical recess end 37a, is also vertical, whereas the end 38b of the boss and which corresponds to the sloping recess end 37b is also sloping. This construction permits the recess end 37a to stay in contact with the boss end 38a while the vent cap is being turned in clockwise direction to bring the threads on the cap into engagement with the threads in the neck 16 and the under surface 39 of the head of the cap against the upper end 40 of the neck 16 of the cover 14. On the other hand, if it is attempted to bring the first thread of the cap into the mouth of the threads in the cover by turning the cap in the counter-clockwise direction and an obstruction is met (as explained later) the tapered surface 37b of the recess 37 in the cap will ride up the slanting surface 38b of the boss 38 and so prevent the further turning of the valve 10 in the counter-clockwise direction.

As the cap is turned in clockwise direction to bring the under surface 39 of the head of cap tightly against the upper edge 40 of the cover neck, the valve is thereby turned in the direction to bring the aperture 11 in the valve into registry with the vent passage 24, and when the cap is turned in counter-clockwise direction to unscrew it from the cover the valve is turned in the direction to cover the vent opening. In the upper part of the hollow interior of the vent cap is interposed a splash plate or diaphragm 41 with vent openings 42 at opposite edges. In the top of the cap is a vent hole 43.

It is necessary to the successful operation of the present type of closure device that when the vent cap is screwed down into final position in the cover there will be a free passageway leading from the gas-receiving space above the electrolyte to the vent hole in the cap, and that when the cap is removed from the cover the gas-receiving space be sealed from the atmosphere. Since the upper end of the neck of the cover constitutes a fixed stop for the cover, it is only necessary in the present closure device to arrange properly the relative positions of the boss 38 and notch 11, and their relative positions to the vent passage 24 to assure the registry of the notch 11 with the vent passage 24 when the cap is in the cover, as shown in Figs. 5, 6 and 7.

The removal of the vent cap from the cover, as stated above, is effected by turning the cap in counter-clockwise direction and this movement causes the valve 10 to be turned to cover the passage 24 as shown in Figs. 1, 2 and 3. In order that the cap may not be turned too far in the counter-clockwise or removal direction as to bring the notch 11 into registry with the vent passage 24 again, the lower end of the valve sleeve 19 is provided with a downwardly extending lug 45 which serves as a stop that is encountered by the flat-faced end 46 of the key 29 when the cap and the valve have been turned far enough in the counter-clockwise direction to close the passage 24, at or before which point the threads of the cap become disengaged from the threads of the neck of the cover, thereby permitting the cap to be removed so that liquid may be introduced into the battery box. In Figs. 1 and 3 the key 29 is shown abutting the stop 45 while the valve 10 is shown covering the vent opening 24.

By providing the key 29 with a cam surface 48 facing in the clockwise direction and slotting the lower end of the resilient valve tube 28 so that the lower end of the tube wall carrying the key will yield readily when the cam surface 48 of the key encounters edge 49 of stop 45 and passes into engagement with the inner surface of the stop lug 45, the valve may be turned continuously in the clockwise direction. This is of advantage when replacing the vent cap on the cover after a filling operation. When the cap is removed from the cover at the point where the threads on the cap become disengaged from the threads on the cover, and the boss 38 is not moved during the filling operation, the cap may be readily replaced on the cover by simply bringing the recess 37 over the boss 38, that is, with the cap threads in registry with the mouth of the threads on the cover. It sometimes happens, however, that the boss 38 is moved during the filling operation, so that when the recess 37 is brought down over the boss 38 the first cap thread is not in registry with the mouth of the cover threads. The cap must now be turned in either direction to reach this point. It is undesirable that it be in continuous driving engagement with the boss 38 in the counter-clockwise direction owing to the fact that the stop lug 45 is in the path of the flat-faced end 46 of the key 29, since damage might ensue if the counter-clockwise turning force be too great. Hence the provision of the slanting surfaces 37b and 38b, preventing the counter-clockwise turning of the cap beyond this point, and hence the arrangement of the cam surface 48 and the resiliency of the lower end of the tube wall carrying the key 29, permitting the turning of the cap in the clockwise direction until the threads on the cap are in registry with the mouth of the cover threads.

To recapitulate briefly the mode of operation of the improved container cover with its novel closure device assembled as described above: Assuming the vent cap 35 to be in its ultimate position on the cover 14, as shown in Fig. 4, the gas generated during the operation of the battery rises from the electrolyte into space 22. It thence passes through the vent passage 24 into the tubular lower part of the vent cap, thence through the openings 42 and finally out through the vent hole 43. Should liquid be splashed upwardly through opening 27 in the valve tube 28, or through vent passage 24, the diaphragm 41 will prevent it from passing out through the vent hole 43. When the battery requires more water, the vent cap is turned in the counter-clockwise or removal direction until the key 29 approaches or encounters the stop lug 45. This movement closes the vent passage 24 by the valve 10. The cap being removed, liquid is poured down the relatively small filling opening 27 in the tubular valve body 28 until it begins to rise therein. This indicates that the electrolyte has risen to its predetermined level 21. If the operator inadvertently pours in more liquid, the electrolyte cannot rise higher in the container than the level 21 because of the compression of the gases in the now air-tight space 22, although it can rise to the top of the neck 16. The vent cap is now screwed back into cover-closing position, thereby bringing the notch 11 into registry with the vent passage 24 and permitting any compressed gas in the space 22 to escape to the atmosphere. If surplus liquid had been poured into the battery box, even up to the rim of the neck 16, it will now subside and all the electrolyte be at a uniform level.

In the event a larger opening is required for the filling and emptying of the battery box than is provided by the filling opening 27 in the annular valve 10 and its tube 28, the valve may be removed from the valve sleeve 19 so that the relatively large opening through the valve sleeve will be available for the filling and emptying of the battery box. The removal of the valve from the valve sleeve is effected by turning the valve in the clockwise direction until the cam surface 48 of the key 29 is brought against the edge 49 of the stop lug 45, under which the cam passes until the whole of the outer surface of the key is in contact with the inner surface 50 of the lug 45. The valve may now be pulled out of the valve sleeve by a suitable tool, making available the relatively large opening through the valve sleeve for filling and emptying purposes.

It will have been observed that the filling opening 27 of the valve 10 and its tube 28 is of considerably smaller diameter than the opening through the length of the valve sleeve 19 in which the valve tube 28 is mounted, and so is of much smaller volume ratio to the space 22 than is the capacity of the valve sleeve. Consequently, by providing the relatively small opening 27 in the valve itself for the occasional replenishing of the liquid in the container, rather than the relatively large opening in sleeve 19 for use in filling and emptying the container during the plate-charging operations, the possible eventual filling of the container up to the surface 18 of the cover is considerably delayed and usually prevented, depending of course on how frequently the refilling occurs and how low the liquid is in the container when more liquid is poured in.

The valve is readily returned to operative position in the valve sleeve by first inserting the key 29 in the mouth or upper end of the valve sleeve, pressing it against the wall of the sleeve until the tube wall carrying the key gives way sufficiently to permit the lower end of the other tube wall to enter the mouth of the valve sleeve, and then pushing downwardly on the valve until it contacts with the valve seat, at which point the lower end of the key-carrying wall springs outwardly bringing the key under the lower end of the valve sleeve. If by chance the key should arrive at the lower end of the sleeve opposite the stop 45, it is only necessary to turn the valve in either direction until the key freed from the stop snaps under the lower end of the sleeve.

Having thus described the invention what we claim as new is:

1. A container cover having a top wall, an annular valve seat formed in the upper surface of the top wall, a valve sleeve projecting downwardly from and concentrically with the valve seat and having an opening therethrough of the same diameter throughout its length, there being a vent passage from the valve seat extending downwardly through the top wall, an annular valve seated on the valve seat for closing the vent passage and having an aperture therethrough arranged to register with the vent passage in one position of the valve, the valve having a downwardly extending tube with a filling opening extending therethrough rotatably mounted in the valve sleeve, and means for turning the valve in one direction to close the vent passage and in the opposite direction to bring the aperture in the valve into registry with the vent passage, the lower end of the valve being radially flexible and extending below the lower end of the valve sleeve, an outwardly extending key carried by the lower end of the valve tube for engaging with the under surface of the lower end of the valve sleeve to prevent upward movement of the valve tube except at a certain point, a stop lug extending downwardly from the lower end of the valve sleeve against which the key comes in contact during the turning of the tube, said key having a cam surface pointing in one direction, the flexibility of the lower end of the valve tube permitting the cam surface to pass to the inner side of the lug so that the valve tube may be withdrawn from the valve sleeve to make available the opening in the latter for filling and emptying purposes.

2. A container cover having a top wall, an annular valve seat formed in the upper surface of the top wall with a central opening therein, a valve sleeve projecting downwardly from the valve seat with its lower end below the under surface of the top wall and having an opening of uniform diameter extending therethrough communicating at its upper end with the opening in the valve seat, there being a vent passage extending from the valve seat downwardly through the top wall, an annular valve seated on the valve seat for closing the vent passage and having an aperture therethrough arranged to register with the vent passage in one position of the valve, the valve having a downwardly extending tube with a filling opening extending therethrough rotatably mounted in the valve sleeve, means for turning the valve in one direction to close the vent passage and in the opposite direction to bring the aperture in the valve into registry with the vent passage, a portion of the lower end of the valve sleeve projecting downwardly as a stop lug, the lower end of the valve tube having a portion extending downwardly below the remainder of the lower end of the valve sleeve provided with an outwardly projecting key engaging with the under surface of the lower end of the main portion of the valve sleeve, one end of said key being formed as a cam surface and the other end of the key constituting a stop surface, the lower end of the valve tube being radially flexible, the arrangement being such that when the valve tube is turned in the direction in which the cam is facing the valve tube may be turned continuously in that direction, and when the valve tube is turned in the opposite direction, the stop surface on the key encounters the stop lug on the valve sleeve and the tube is thereby prevented from further turning in that direction.

3. A container cover having a top wall, a valve sleeve projecting downwardly from the top wall with its lower end below the under surface of the top wall and having an opening extending therethrough, an annular valve seat formed on the upper side of the top wall concentrically with the opening therein, a threaded neck on the cover surrounding the valve seat, there being a vent passage extending downwardly from the valve seat through the top wall, a rotatable valve seated on the valve seat and having an aperture therethrough, the valve having a closed position for closing the vent passage and an open position with the aperture in alinement with the vent passage, the valve having a downwardly extending tube with an opening extending therethrough rotatably mounted in the valve sleeve, a threaded vent cap adapted to be screwed fully into the threaded neck to turn the valve to open position and to be unscrewed fully from the neck to turn the valve to closed position, the valve and the vent cap having separable interengaging parts, the valve tube being provided with a cam surface facing in the direction in which the valve is turned to open position and with a stop surface facing in the direction in which the valve is turned to closed position, the valve sleeve being provided with a stop located in the circle of movement of the cam and stop surface, the part of the valve on which the cam and stop surface are mounted being yieldably movable toward and from the circle of movement in which the stop on the valve sleeve is located so that when the valve is turned in the direction in which the cam faces, the cam rides over the stop on the valve sleeve and when the valve is turned in the opposite direction the stop surface thereon contacts with the stop on the valve sleeve and the valve is thereby held against further turning in that direction.

4. A container cover having a top wall, a valve sleeve projecting downwardly from the top wall with its lower end below the under surface of the top wall and having an opening extending therethrough, an annular valve seat formed on the upper side of the top wall concentrically with the opening therein, a threaded neck on the cover surrounding the valve seat, there being a vent passage extending downwardly from the valve seat through the top wall, a rotatable valve seated on the valve seat and having an aperture therethrough, the valve having a closed position for closing the vent passage and an open position with the aperture in alinement with the vent passage, the valve having a downwardly extending tube with an opening extending therethrough rotatably mounted in the valve sleeve, a threaded vent cap adapted to be screwed fully into the threaded neck to turn the valve to open position and to be unscrewed fully from the neck to turn the valve to closed position, the valve and the vent cap having separable interengaging parts, the valve tube being provided with a cam surface facing in the direction in which the valve is turned to open position and with a stop surface facing in the direction in which the valve is turned to closed position, the valve sleeve being provided with a stop located in the circle of movement of the cam and stop surface, the part of the valve on which the cam and stop surface are mounted and the part of the valve sleeve on which the stop is formed being relatively yieldably movable toward and from each other, thereby causing the stop surface of the valve to contact with the stop on the valve sleeve to prevent further turning of the valve when the valve is turned in the direction in which the stop surface faces and permitting the cam to move past the stop on the valve sleeve when the valve is turned in the opposite direction.

5. A container cover having a top wall, a valve sleeve projecting downwardly from the top wall with its lower end below the under surface of the top wall and having an opening extending therethrough, an annular valve seat formed on the upper side of the top wall concentrically with the opening therein, a threaded neck on the cover surrounding the valve seat, there being a vent passage extending downwardly from the valve seat through the top wall, a rotatable valve seated on the valve seat and having an aperture therethrough, the valve having a closed position for closing the vent passage and an open position with the aperture in alinement with the vent passage, the valve having a downwardly extending tube with an opening extending therethrough rotatably mounted in the valve sleeve, a threaded vent cap adapted to be screwed fully into the threaded neck to turn the valve to open position and to be unscrewed fully from the neck to turn the valve to closed position, the valve and the vent cap having separable interengaging parts, the valve tube being provided with a cam surface facing in the direction in which the valve is turned to open position and with a stop surface facing in the direction in which the valve is turned to closed position, the valve sleeve being provided with a stop located in the circle of movement of the cam and stop surface, the part of the valve on which the cam and stop surface are mounted being yieldably movable toward and from the circle of movement in which the stop on the valve sleeve is located so that when the valve is turned in the direction in which the cam faces, the cam rides over the stop on the valve sleeve and when the valve is turned in the opposite direction the stop surface thereon contacts with the stop on the valve sleeve and the valve is thereby held against further turning in that direction, the separable interengaging parts of the valve and the vent cap consisting of an upwardly projecting boss on the valve and a recess in the vent cap, the sides of the boss and the recess in working contact with each other when the valve is turned in the direction in which the cam faces being substantially vertical, and the sides of the boss and the recess in working contact with each other when the valve is turned in the opposite direction being slanting to permit their ready disengagement when the stop surface of the valve encounters the stop on the sleeve.

6. A container cover having a top wall, a valve sleeve projecting downwardly from the top wall with its lower end below the under surface of the top wall and having an opening extending therethrough, an annular valve seat formed on the upper side of the top wall concentrically with the opening therein, a threaded neck on the cover surrounding the valve seat, there being a vent passage extending downwardly from the valve seat through the top wall, a rotatable valve seated on the valve seat and having an aperture therethrough, the valve having a closed position for closing the vent passage and an open position with the aperture in alinement with the vent passage, the valve having a downwardly extending tube with an opening extending therethrough rotatably mounted in the valve sleeve, a threaded vent cap adapted to be screwed fully into the threaded neck to turn the valve to open position and to be unscrewed fully from the neck to turn the valve to closed position, the valve and the vent cap having separable interengaging parts, the valve tube being provided with a cam surface facing in the direction in which the valve is turned to open position and with a stop surface facing in the direction in which the valve is turned to closed position, the valve sleeve being provided with a stop located in the circle of movement of the cam and stop surface, the part of the valve on which the cam and stop surface are mounted and the part of the valve sleeve on which the stop is formed being relatively yieldably movable toward and from each other, thereby causing the stop surface of the valve to contact with the stop on the valve sleeve to prevent further turning of the valve when the valve is turned in the direction in which the stop surface faces and permitting the cam to move past the stop on the valve sleeve when the valve is turned in the opposite direction, the separable interengaging parts of the valve and the vent cap consisting of an upwardly projecting boss on the valve and a recess in the vent cap, the sides of the boss and the recess in working contact with each other when the valve is turned in the direction in which the cam faces being substantially vertical, and the sides of the boss and the recess in working contact with each other when the valve is turned in the opposite direction being slanting to permit their ready disengagement when the stop surface of the valve encounters the stop on the sleeve.

ROLAND REPPERT.
RUDOLPH A. JOHNSON.